United States Patent [19]

Chapman, Jr. et al.

[11] Patent Number: 4,458,288

[45] Date of Patent: Jul. 3, 1984

[54] ELECTRICAL PROTECTIVE DEVICES

[75] Inventors: John L. Chapman, Jr., Catonsville; Thomas A. La Valle, Annapolis; Peter S. Nelson, Severna Park, all of Md.

[73] Assignee: AT&T Technologies, Inc., New York, N.Y.

[21] Appl. No.: 383,385

[22] Filed: May 28, 1982

[51] Int. Cl.³ .................................. H02H 9/06

[52] U.S. Cl. .................................. 361/124; 361/119; 337/32; 337/34

[58] Field of Search .............. 361/119, 124, 120, 118, 361/117, 56; 337/28, 29, 31, 32, 34

[56] References Cited

U.S. PATENT DOCUMENTS

| | | | |
|---|---|---|---|
| 4,168,515 | 9/1979 | Baumbach | 361/124 |
| 4,307,430 | 12/1981 | Montalto et al. | 361/124 |
| 4,327,393 | 4/1982 | Hines et al. | 361/119 |
| 4,335,416 | 6/1982 | Hollfelder et al. | 361/124 X |

*Primary Examiner*—Patrick R. Salce
*Attorney, Agent, or Firm*—E. W. Somers

[57] ABSTRACT

A protector module (30) for protecting tip and ring conductors of a telephone loop includes a pair of protector assemblies (40–40') which are supported within a common housing (32). A voltage protection subassembly (42) of each protector assembly is connected electrically to a grounding subassembly (44) for causing current associated with excessive voltage surges to be conducted to ground. Each protector assembly also includes a current protection subassembly (41) which comprises a dielectric base and a line pin (61) and a central office pin (57) with the line and central office pins being connected together electrically to establish electrical contact between a conductor of the circuit and its protector assembly. A shunting element (62) is disposed concentrically about the line pin and is releasably secured to one end of the line pin in an initial position by a fusible bonding material. A spring (43) between a cup (93) of the voltage protection subassembly and the housing maintains the voltage protection subassembly in engagement with the shunting element. Also, the spring is effective when current flow exceeds a predetermined level that is sufficient to melt the fusible bonding material to cause the shunting element to be moved to a position where it engages a portion (86) of the grounding subassembly to establish a fault current path to ground. For a prolonged voltagesurge, heat energy is transferred from the voltage protection subassembly to the shunting element and melts the fusible bonding material to allow the shunting element to be moved as in a current overload mode.

25 Claims, 29 Drawing Figures

121
126
43
131
132
42
101
41'
91
86
88
44
81
57
61
146
141
142
147
120
41
122

ELECTRICAL PROTECTIVE DEVICES

BACKGROUND OF THE INVENTION

1. Field of the Invention

This invention relates to electrical protective devices. More particularly, it relates to devices for protecting communications circuits against excessive voltage surges and excessive currents.

2. Description of the Prior Art

In telephone engineering, it is usual practice to provide protectors at central offices for each incoming line. These protectors, which may be termed modules, combine protection against excessive voltages resulting from lightning, for example, with protection against sneak currents. Sneak currents are not strong enough to do any damage if they flow briefly, but may generate enough heat to char conductor insulation and do other damage if allowed to persist. The sneak currents are produced by voltages of relatively low magnitude as compared to the excessive voltages mentioned hereinabove and usually result from accidental interference between telephone lines and adjacent power lines.

Protection of a telephone line against excessive voltage is usually provided by a so-called spark-gap protector which generally includes a pair of spaced carbon electrodes or a gaseous discharge device. One of the electrodes is usually connected to ground and the other is usually connected to the incoming telephone line. Should a high voltage be impressed on the line, it will bridge the space or gap between the electrodes and cause current to flow to ground, thus bypassing sensitive equipment which is associated with the line.

The second type of protection is commonly provided by a device that is referred to as a heat coil. The heat coil includes a coil of small guage, high resistance wire which is wound on a metal sleeve inside of which a contact pin is held in a predetermined position by a fusible bonding material such as solder, for example. Should excessive currents occur on the line and persist, sufficient heat will be generated by the coil of wire to melt the solder and release the pin. A spring is usually provided which urges the released pin into electrical contact with a source of ground potential to ground the line and protect sensitive line equipment.

A protector assembly of this general type is disclosed in U.S. Pat. No. 2,546,824 which was issued to P. P. Koliss on Mar. 27, 1951. A contact pin of a heat coil subassembly protrudes into a bore that extends through one of two carbon block electrodes of the spark-gap protector and is releasably held in a sleeve by a solder joint. It includes a pair of springs, one of which retains the elements of the assembly in abutting relation. When the pin is released by current buildup in the heat coil that melts the solder joint, the other spring urges the contact pin through the one carbon electrode into engagement with the other electrode which is connected to a source of ground potential.

Inasmuch as a ring conductor and a tip conductor are associated with each telephone station apparatus, each telephone line requires two protector assemblies. A telephone circuit protector module shown in J. B. Geyer et al U.S. Pat. No. 3,573,695 which issued on Apr. 6, 1971 and which is incorporated by reference hereinto includes two protector assemblies enclosed in a single insulative housing to save space, to protect the assemblies from dust, and to facilitate installation. Each protector assembly includes a spark-gap subassembly, having spaced carbon blocks, for excessive voltages and a heat coil subassembly for excessive currents. The spark-gap and heat coil subassemblies are held in abutting aligned relation by a single spring which is part of the normal transmission circuit. The spring also serves to propel a pin of the heat coil subassembly into engagement with a grounding circuit, which includes one of the carbon blocks, during the passage of excessive currents through the heat coil. In Geyer et al, the axis of each heat coil pin is aligned axially with the axis of its associated carbon blocks.

While modules such as those described hereinabove have proved very useful in protecting telephone circuits from excessive voltages and currents, efforts have been made to introduce improvements. For example, to complete a fault current path to ground, the pin in the heat coil subassembly must be brought into contact with a carbon block in the spark-gap protector subassembly. This causes excessive heating of the spark-gap subassembly which becomes part of the fault path. Heat build-up in the carbon blocks of the spark-gap subassembly is commonplace because of their relatively high resistance. A further disadavantage is that the physical arrangement of the heat coil subassembly utilizes excessive space within the protector module. This together with the extension of a contact pin through the voltage protection portions of the protector has precluded the use of gaseous discharge devices in place of carbon blocks. Gaseous discharge devices, which are commonly referred to as gas tubes, are desirable because of their longer lives and because they afford better control of the breakdown voltage.

These last-mentioned problems have been overcome by a protector module shown in U.S. Pat. No. 4,215,381 which issued on July 29, 1980, to R. F. Heisinger and which is incorporated by reference hereinto. The module includes a heat coil subassembly for sensing excessive currents and a voltage surge limiter assembly which is axially aligned with the heat coil subassembly for conducting excessive voltages through a grounding subassembly to a source of ground potential. When excessive currents are encountered in a line circuit, the protector provides a direct metallic contact between the line circuit and ground.

In the Heisinger arrangement, gaseous discharge devices may be used inasmuch as the voltage protection portion of the protector is taken out of the fault circuit. When sufficient heat is transferred to the heat coil subassembly such as by a current fault, a fusible alloy melts to allow a spring to cause a heat coil flange to move and touch a laterally projecting tab of a ground terminal assembly. This creates an electrical path external to the voltage protector subassembly through to the ground terminal assembly. If a prolonged voltage surge occurs, there is an arcing over in the voltage surge limiter assembly, heat energy is transferred to a pin of the heat coil which engages a portion of the voltage surge limiter assembly, the fusible alloy is melted, and the spring moves the heat coil flange plate as before.

Although the Heisinger protector module overcomes the problem of prior art arrangements which precluded the use of gaseous discharge devices for voltage surge protection, it continues to use a spring as part of the normal transmission and fault current circuits. Since the spring moves slidably, insulating sleeves are disposed about the spring to prevent shorting. At times, the presence of the spring in the voice frequency circuit results in noise on the line.

A protector module in which a spring is not in the transmission circuit is disclosed in U.S. Pat. No. 4,168,515. When an excessive circuit increase occurs, a fusible alloy is melted to allow a bobbin on a pin of a heat coil assembly to be moved by the spring. This allows a cup, which is supported indirectly by the bobbin, to be moved by the spring to engage a plate to which the heat coil, line and central office pins are staked. As a result, a fault current path is established from the line pin through the cup to a ground plate.

The aforementioned prior art protector assemblies each include a seemingly excessive number of elements. Since substantial quantitites of these protectors are produced annually, deletion of one or more elements in each protector assembly would result in substantial cost reductions. What is needed is an electrical protective device which is relatively simple with a minimal number of elements, but is one which does not sacrifice the protection afforded to a telephone circuit. Also, the desired device should be one in which carbon blocks or gas tubes could be used interchangeably and one in which there is no spring in the normal transmission circuit.

SUMMARY OF THE INVENTION

The foregoing problems have been overcome by the protector assembly of this invention. The protector assembly includes a dielectric housing for supporting the protector assembly and a grounding subassembly that is adapted to connect the assembly to ground when excessive voltage surges and excessive current increases appear in the circuit. A voltage protection subassembly is connected electrically to the grounding subassembly for conducting current associated with excessive voltage surges to ground. The protector assembly also includes a current protection subassembly having a dielectric base, first and second electrically conductive elements mounted in said base and a shunting element which are connected together to establish electrical contact between the circuit and the protector assembly. The shunting element is aligned axially with the first element and releasably secured thereto by a fusible bonding material. A spring is interposed between the voltage protector subassembly and the housing for maintaining the voltage protection subassembly in engagement with the shunting element. When the current flow increases above a predetermined level, the fusible bonding material melts and the spring is effective to cause the shunting element to be moved along the first conductive element to engage the grounding subassembly and provide a current path from the first conductive element to ground.

The current protection subassembly includes current responsive means such as a heat coil which is disposed concentrically about the first conductive element in a first position therealong. The heat coil includes a sleeve having convolutions of a wire wrapped thereabout with one end of the wire bonded to one end of the sleeve which engages the voltage protection subassembly. The other end of the wire is bonded to the second conductive element. When current flow above the predetermined level occurs, sufficient heat is transferred to the sleeve to melt the fusible bonding material. This permits the spring to cause the sleeve to be moved to a second position where the other end of the sleeve engages the grounding subassembly to establish a fault current path and shunt the current to ground.

In the protector assembly of this invention, the axis of each current responsive means of each current protection subassembly is aligned with a line pin but the line pin is offset from the axis of the voltage protection subassembly. Advantageously, the spring which is disposed within the same housing as the heat coil subassembly and the voltage protector subassembly is removed from the current flow paths. The removal of the spring from the current paths eliminates the need for insulating sleeves, and eliminates a potential source of noise in the line. A further feature of the module of this invention is the combination of the current responsive means and the line pin into one subassembly. This eliminates the need for a separate line terminal assembly which is customary in prior art protector modules.

Another embodiment of the invention includes provisions for direct test access to the tip and ring sides the protector assembly. In it, the housing is provided with access holes in a closed end of the housing. End portions of the springs adjacent to the closed end of the housing are disposed in metallic retainer cups which may be engaged by test probes that extend into the access holes. A metallic strap extends from the cup and has a portion disposed between a center electrode of the voltage protector subassembly and an adjacent sleeve of the heat coil subassembly.

In a method of assembling the protector module of this invention, the housing is inverted with its closed end oriented downwardly and two springs are dropped thereinto. Then, two preassembled voltage protector subassemblies are dropped into the inverted housing after which left and right hand base halves having preinserted line and central office pins together with a grounding subassembly are assembled and the base snap-locked to the housing. The module of this invention allows a significant reduction in the steps required for assembly. In one presently used prior art protector module for example, a ground plate base and voltage protection subassembly must be assembled. Then a line terminal assembly which includes a heat coil insulating sleeve and spring must be precompressed to fit into priorly assembled portions. This requires manual dexterity and the use of auxiliary tools, much of which is reduced with the present arrangement.

BRIEF DESCRIPTION OF THE DRAWINGS

Other features of the present invention will be more readily understood from the following detailed description of specific embodiments thereof when read in conjunction with accompanying drawings, in which.

DETAILED DESCRIPTION

Figure 1:
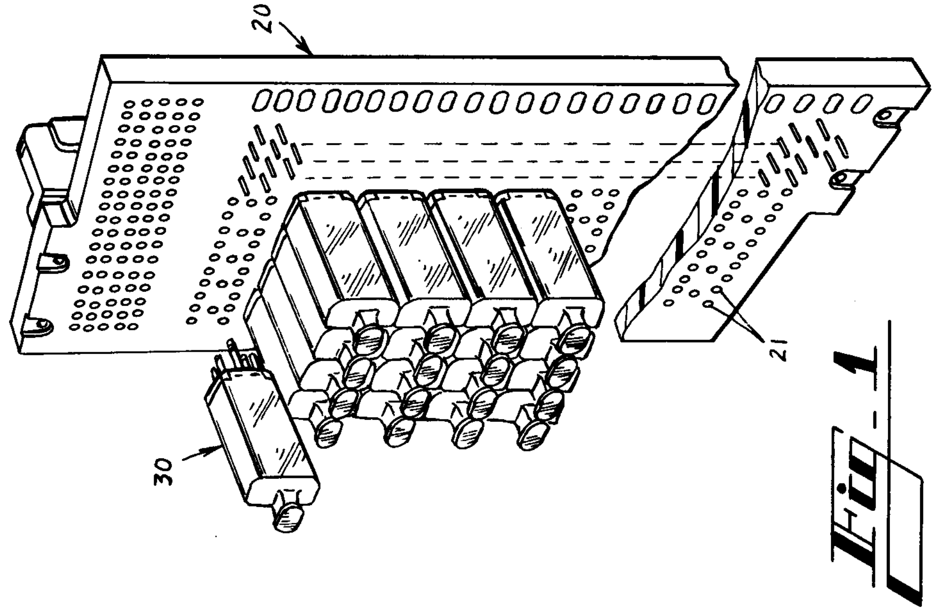
FIG. 1 is a perspective view of an arrangement for mounting a plurality of electrical protective devices of this invention.

Referring now to FIG. 1 there is shown a panel which is designated generally by the numeral 20 and which has a plurality of sockets 21—21 therein for receiving a plurality of pins projecting from an array of circuit protector modules, designated generally by the numerals 30—30. It should be apparent that since the panels 20—20 are existing, the holes for receiving the pins of protector modules are established. Accordingly, any protector module which is to be used therewith must have its terminal pins aligned with those holes.

Figure 2A:
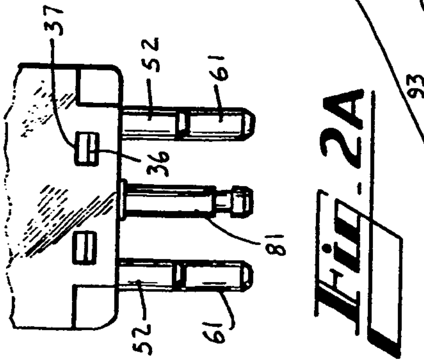
FIG. 2A is a detail view of a portion of the protector module of FIG. 2.
Figure 2:
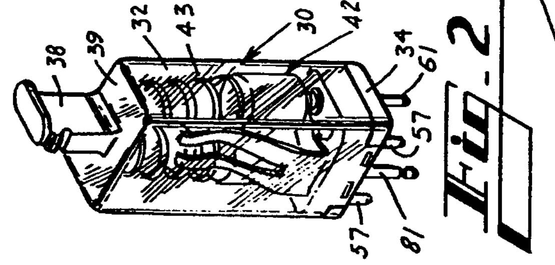
FIG. 2 is a perspective view of a protector module which includes a pair of the electrical protector assemblies of this invention.

Referring now to FIGS. 2–6 of the drawings, there is illustrated a preferred embodiment of the protector module of this invention. A plastic housing 32 is shown with a base subassembly 34 which is snap-fastened thereto by tangs 36—36 (see FIG. 2A) on the base which are received in two pairs of slots 37—37 in the housing. As can be seen in the drawings, a finger grip 38 is provided adjacent to a closed end 39 of the housing.

Figure 3:
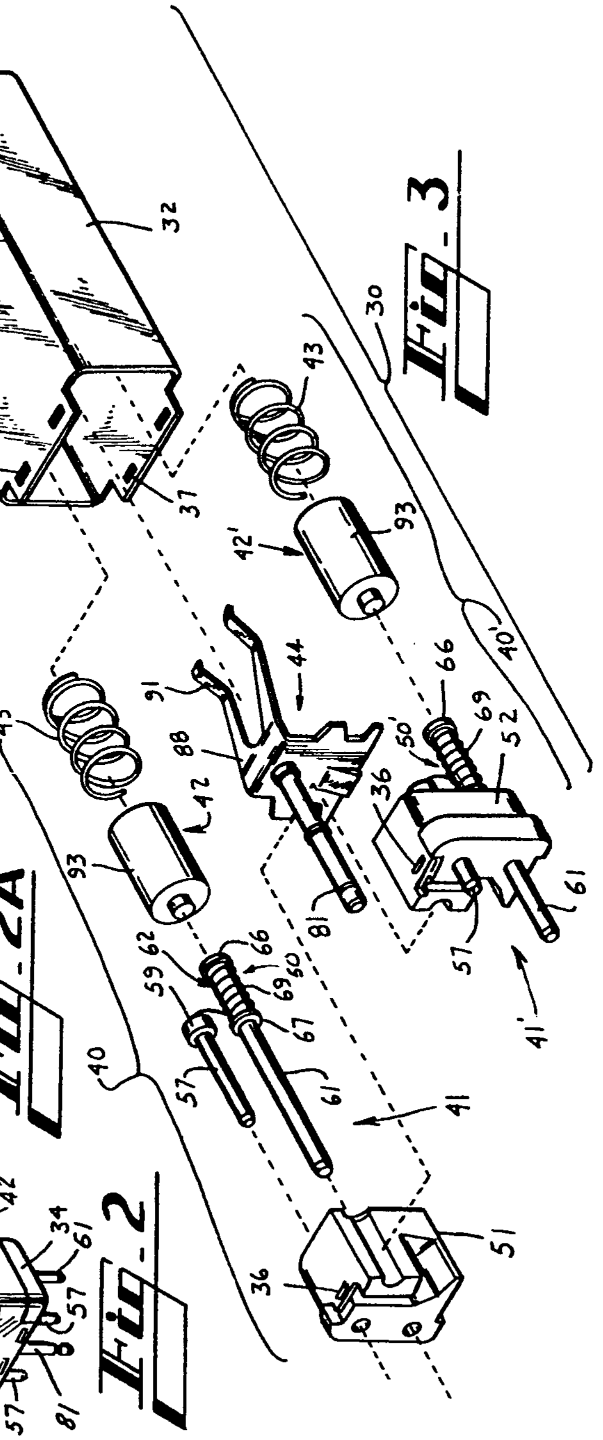
FIG. 3 is an exploded perspective view of the protector module of this invention.
Figure 7:
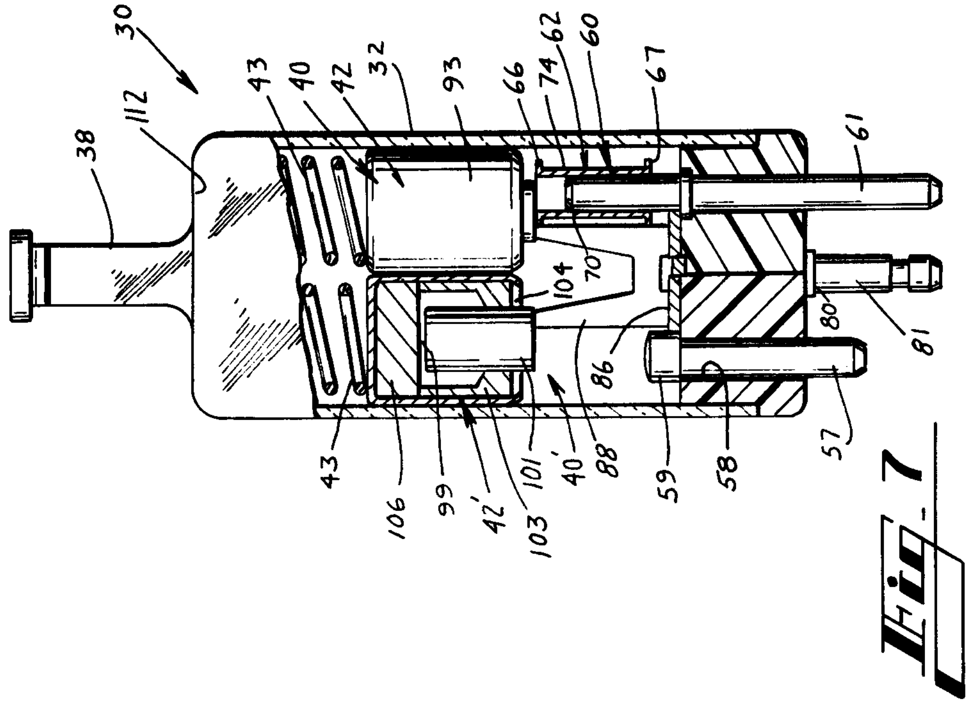
FIG. 7 is a front elevational view partially in section of the module of FIG. 2.
Figure 6:
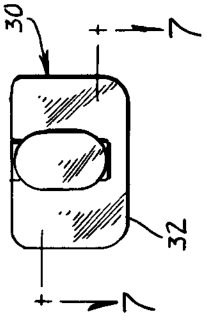
FIG. 6 is a plan view of the module shown in FIG. 4.
Figure 5:
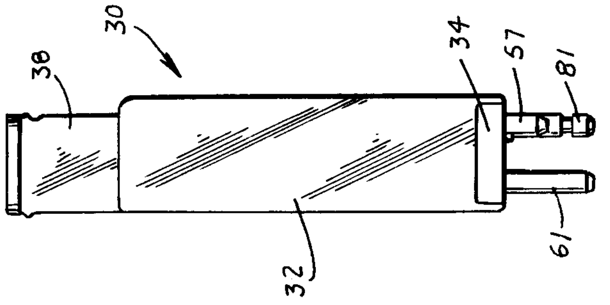
FIG. 5 is a side elevational view of the module of FIG. 2.
Figure 4:
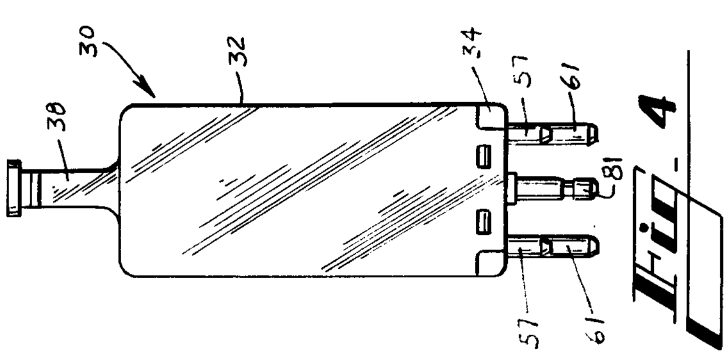
FIG. 4 is a front elevational view of the module of FIG. 2.

As can be seen in FIGS. 3 and 7, a pair of protector assemblies, designated generally by the numerals 40 and 40' are enclosed in the housing 32. One of the protector assemblies provides protection for a ring conductor and the other provides protection for a tip conductor of an associated telephone circuit (not shown). Except for base portions of each, the protector assemblies 40 and 40' are structurally identical to each other. Therefore, except for the base portions of each, the same numerals will be used for corresponding parts of the two protector assemblies with the general designation of subassemblies for one having a primed superscript.

Referring particularly to FIG. 3, it can be seen that the protector assembly 40 includes a current overload or protection subassembly which is designated generally by the numeral 41, a voltage protection subassembly which is designated generally by the numeral 42 and a compression spring 43. The voltage protection subassembly 42 is sometimes referred to as a voltage surge limiter subassembly. The protector module 30 also includes a grounding subassembly which is designated generally by the numeral 44 and which is common to both assemblies 40 and 40'.

Figure 11:
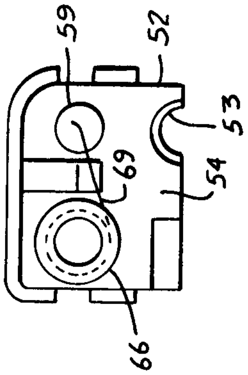
FIG. 11 is a plan view of a portion of the base of the heat coil subassembly of FIG. 9.
Figure 9:
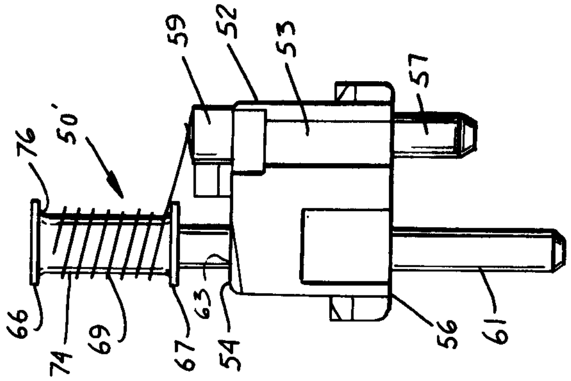
FIG. 9 is a front elevational view of a heat coil subassembly of the protector module of this invention.
Figure 10:
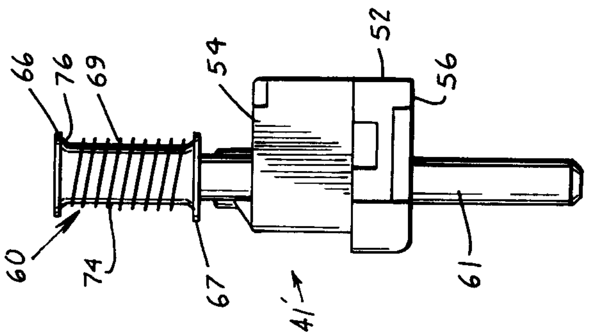
FIG. 10 is a side elevational view of the heat coil subassembly of FIG. 9.

The current protection subassembly 41 of the protector assembly 40 includes a current responsive portion 50 (see FIG. 3) which is generally referred to as a heat coil subassembly. The heat coil subassembly 50 is mounted in a left-hand base portion 51, as viewed in FIG. 3, and the heat coil subassembly 50' is mounted in a right-hand base portion 52. The left-hand and right-hand portions 51 and 52 which together comprise the base 34, are mirror images of each other and, in a preferred embodiment, each is made of a plastic insulating material such as polybutylene terephthalate (PBT). Each base half 51 and 52 (see FIGS. 9–11) also includes a semi-cylindrical passageway 53 formed from a surface 54 to a lower surface 56 thereof. This passageway 53 in one base half is designed to cooperate with the passageway in the other base half when the two are mated together to form the base subassembly 34.

Figure 12:
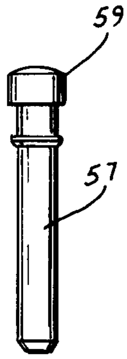
FIG. 12 is an elevational view of a central office pin.

Each portion of the base subassembly 34 supports first and second electrical contact elements which form part of the normal circuit current path. One of these is a central office pin 57 (see FIG. 12) which is mounted in an interference fit in a bore in each one of the base portions. A headed portion 59 of each central office pin 57 extends above the surface 54 of each base half.

Figure 13:
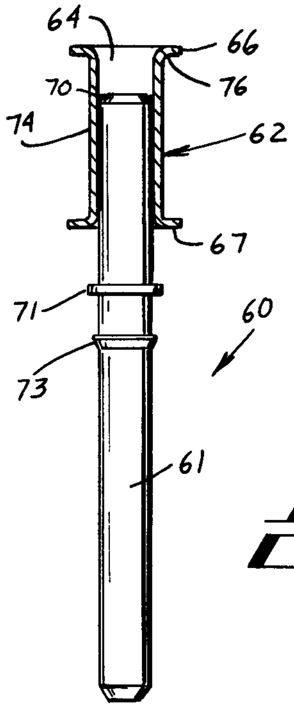
FIG. 13 is an elevational view of a pin-eyelet assembly which comprises a portion of the heat coil subassembly of FIG. 9.

Each heat coil subassembly includes a pin-eyelet subassembly 60 (see FIG. 13). The input to each protector assembly 40–40' of the protector module 30 is through the pin-eyelet subassembly 60. The pin-eyelet subassembly 60 includes a line pin 61 which is received in an interference fit in a bore 63 in the base half 52 (see FIG. 9).

The pin-eyelet subassembly 60 also includes an eyelet 62. The eyelet 62 has the configuration of a sleeve or spool and includes a central passageway 64 and two flanges 66 and 67. The eyelet 62 is designed to hold a plurality of convolutions of a resistance wire 69 (see FIGS. 8–10) of the heat coil subassembly thereon. The upper flange prevents any jamming of the heat coil subassembly 50 between the voltage protection subassembly 42 and the housing 32.

The eyelet 62 is secured in a first protection to one end of the line pin 61 by means of a fusible bonding material 70 (see FIGS. 7 and 13), such as solder, for example, which has a predetermined melting point. The line pin 61 of the pin-eyelet subassembly 60 also includes a flange 71 and a rib 73 which are spaced between the lower end of the line pin and the lower flange 67 of the eyelet.

The wire 69 which is wound about the hub of the eyelet 62 is made from an alloy such as nichrome which in a preferred embodiment is covered with nylon insulation having a wall thickness of 0.008 cm. In the preferred embodiment, the wire 69 is such that its resistance between the line pin 61 and the central office pin 57 is not greater than 4 ohms. One end of the wire 69 is welded to a hub 74 of the eyelet adjacent to an end 76 and an unwound trailing end is welded to the head 59 of the central office pin 57 (see FIG. 9). The eyelet 62 is made of a metallic material since it is part of the loop circuit. The wire 69 is insulated since it is wound on the metallic hub 74 of the eyelet with its convolutions generally touching one another.

A normal circuit path for the current is from the line pin 61 through the sleeve 62, through the wire 69 of the protector assembly 40 and out through the central office pin 57. When there is a current overload, the circuit through the line pin 61 into the metal eyelet 62 and through the wire 69 to the central office pin 57 causes the temperature of the wire to increase. The increased temperature is sufficient to cause the fusible alloy that bonds the eyelet hub 74 to the line pin 61 to melt and permit relative movement between the eyelet and the line pin.

It should be understood that while an eyelet is used in the preferred embodiment, other equivalents could be used. For example, an unflanged sleeve having a passageway therethrough for receiving the line pin 61 could be used. Moreover, only the ends of the sleeve or the eyelet need be conductive with one end of the insulated resistance wire 69 being bonded to one end of the sleeve and with the other end bonded to the headed end of the central office pin 57.

Other arrangements within the scope of this invention are also possible for the heat coil assembly. For example, an eyelet having conductive flanges and a non-conductive hub could be used. The conductive flanges would be bonded to the line pin 61 with the fusible alloy. Uninsulated wire could be wound on the non-conductive hub with the convolutions spaced apart with one end of the wire bonded to a flange and the other linear trailing end welded to the head of the cental office pin as before. As the temperature of wire increases, the hub, which could be some thermally conductive material, will transmit the heat energy to the fusible alloy to melt it and allow operation of the heat coil as before.

The pin-eyelet assembly 61 is mounted in an interference fit in the bore 63 of the heat coil base 51 (see FIGS. 9–11) such that the lower flange 67 of each eyelet 62 is spaced above the top surface of the base. Moreover, the flange 71 and the rib 73 of each line pin 61 are received within the base in order to cause the line pin to be able to resist forces which may be applied axially thereof.

Advantageously, the rib 73 about the line pin 61 causes an interference fit between the plastic of the base half 51 and the pin which is able to resist the force of about five pounds. Such a force may be generated by plugging a protector module 30 into the central office panel 20. Moreover, the shoulder 71 formed on each of the line pins 61—61 is adapted to resist the thrust imparted to the pin assemblies generated by other portions of the module 30. The rib is required to resist the pushing thrust which is in an opposite direction to that experienced by the shoulder 73.

Unlike prior art protector assemblies, the line pin 61 of the protector assembly 40 of this invention for a conductor of each circuit forms a portion of the heat coil portion 50 of the current protection subassembly 41. This can be seen best by comparing FIGS. 14A and 14B. In FIG. 14A is depicted a prior art protector module which includes a heat coil portion 75, a line pin subassembly 78 a ground subassembly 77, and the voltage protection subassembly 42. As can be seen in FIG. 14A, the heat coil subassembly 75 is aligned with the voltage protection subassembly 42 but is offset from a line pin 79. In the protector assembly 40 of this invention (see FIG. 14B), the line pin 61 is aligned with the heat coil but is offset from the voltage protection subassembly 42.

Figure 17:
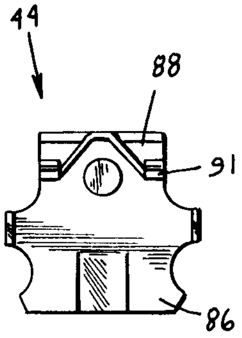
FIG. 17 is a plan view of the grounding subassembly of FIG. 15.
Figure 15:
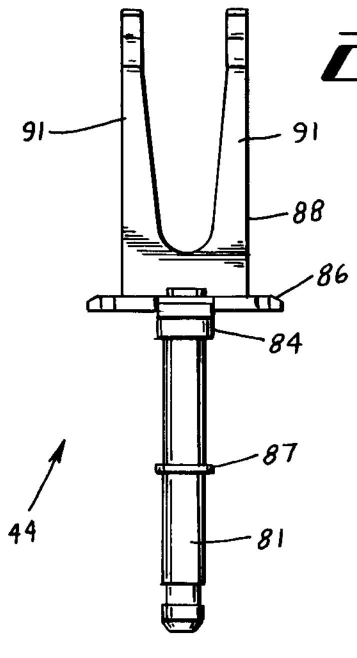
FIG. 15 is a front elevational view of a grounding subassembly of the module of FIG. 2.
Figure 16:
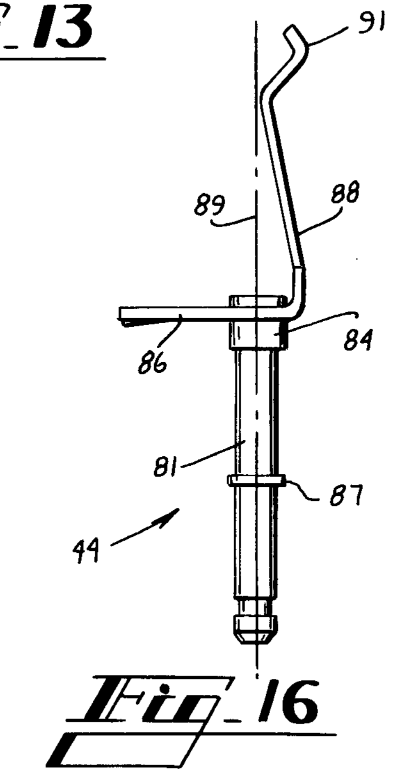
FIG. 16 is a side elevational view of the grounding subassembly of FIG. 15.
Figures 18, 21:
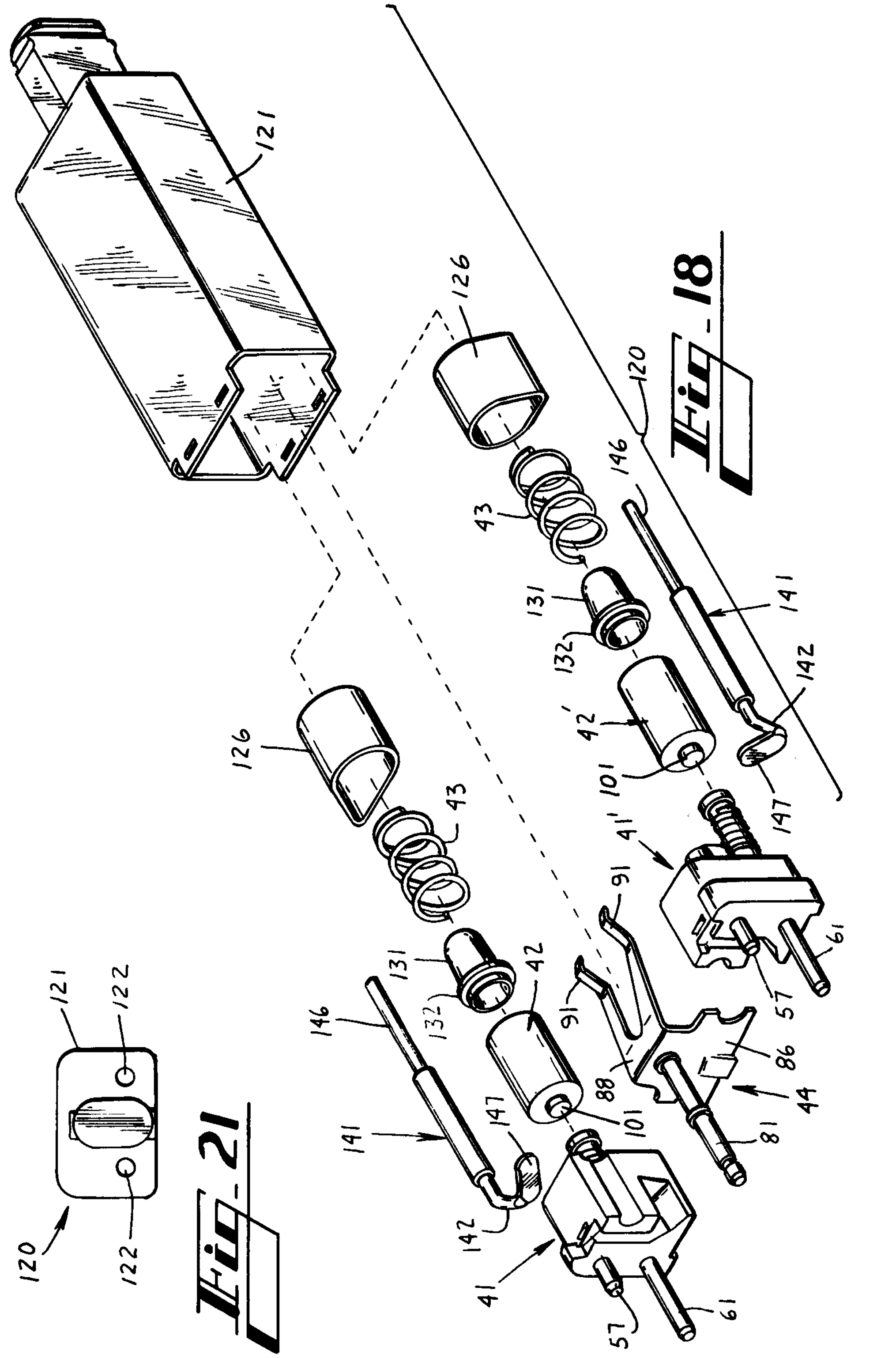
FIG. 18 is an exploded perspective view of an alternative embodiment of this invention.
FIGS. 19–21 are elevational and plan views of the alternate embodiment of the protective device of this invention which includes facilities for engaging test probes.

When the right-hand and the left-hand base assemblies 51 and 52, respectively, are mated together to form the base 34, the semi-cylindrical passageways 53—53 are brought together in order to form a cylindrical passageway 80 (see FIG. 7) for receiving a ground pin 81 of the grounding subassembly 44. The grounding subassembly 44 is shown in FIGS. 15–17 and includes the pin 81 having a shoulder 84 which is riveted to a ground plate 86 which is disposed along the top surface of the mated halves 51 and 52 of the heat coil assemblies. When so disposed, portions of the ground plate 86 are received between the lower flange 67 of each one of the pin eyelet assemblies 60—60 and the top surface 54 of the base (see FIGS. 7–8). The ground plate 86 of the grounding subassembly 44 is disposed between the central office pin 57 and the line pin 61 of each half of the base.

The ground pin 81 of the grounding subassembly also includes a shoulder 87 (see FIGS. 15 and 16). The shoulder 87 is adjacent to the surface 56 of the base 34 when the pin 81 is disposed within the passageway 53.

The grounding subassembly 44 also includes a bifurcated portion 88 which extends upwardly from the plate 86 and inwardly toward a centerline 89 of the ground pin 81 (see FIG. 16). As such, each one of upwardly extending fingers or furcations 91—91 is spaced to one side of the centerline which extends through the ground pin.

Figure 8:
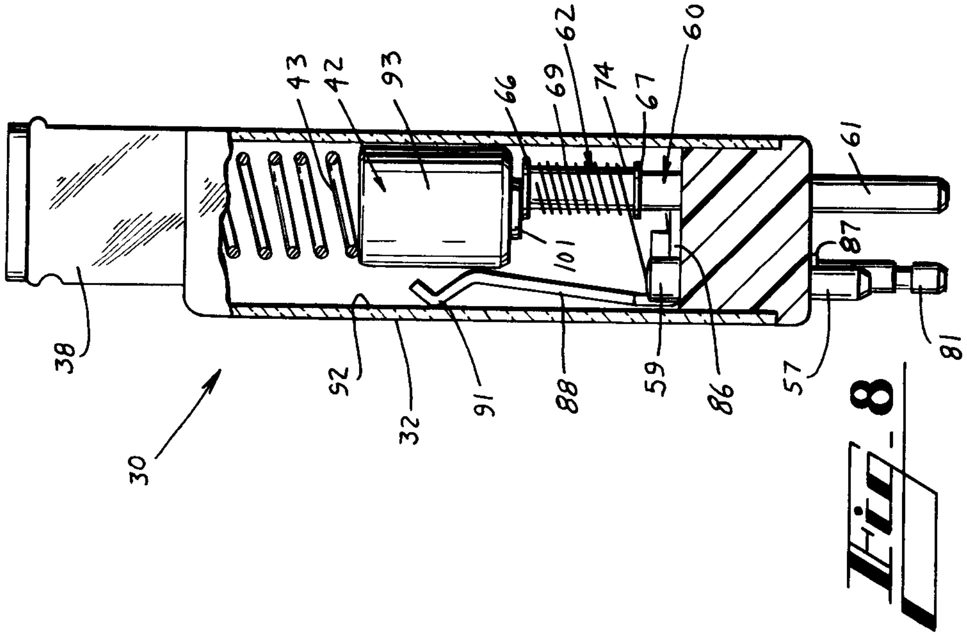
FIG. 8 is a side elevational view of the module of FIG. 2 partially in section.

The fingers 91—91 are configured to establish electrical contact with the voltage protection subassemblies 42—42′ of the module 30. Referring to FIG. 8, it can be seen that the free ends of the fingers 91—91 are shaped to bear against an inner surface 92 of the housing 32 to insure electrical contact with the voltage overprotection device 42. One finger 91 engages a metallic cup 93 which houses the voltage protection subassembly 42 for the protection assembly 40 and the other finger 91 engages a cup 93 which houses the voltage protection subassembly for the protector assembly 40′.

The voltage protection subassembly 42 of the protector assembly 40 include a surge limiter having a pair of electrodes such as a pair of carbon blocks for example, (see FIG. 7). It should be understood that although carbon blocks are shown in the drawings for the voltage overprotection devices, gas tubes, which are well known, also could be used. The cup 93 is positioned such that a lower one of the carbon blocks as shown in FIG. 7 has its electrode protruding therefrom to engage the upper flange 66 of an associated one of the pin eyelet subassemblies 60—60. The carbon blocks are received in the cup 93 in a manner to space them apart through a predetermined gap 99. The gap 99 is effective during a voltage protection mode of the protector to cause a sufficiently high voltage to bridge the gap and cause current to flow to ground.

More particularly, the voltage protection subassembly 42 comprises the cup 93 which supports a center carbon electrode 101 or insert which is disposed within a porcelain shell 103. The center carbon electrode extends through an opening 104 in the porcelain shell and protrudes therebeyond a distance of 0.18 cm. The other end of the carbon electrode 101 is spaced a distance of 0.008 cm from a plane through the open end of the porcelain shell 103. The carbon electrode 101 is bonded to the walls of the opening in the porcelain shell. Also disposed within the cup 93 and in engagement with a closed end thereof is a carbon block 106 which is called a base electrode. The base electrode 106 engages the annular rim of the porcelain shell 103. This causes the base electrode 106 to be spaced from the center electrode 101 a distance of 0.008 cm. This gap which is thereby established between the center electrode 101 and the base electrode 106 is predetermined in accordance with the level of voltage protection desired.

When a surge of excessive voltage is generated in a telephone line by a lightning strike, for example, the resulting potential appears across the protector module through the ring conductor protected by protector assembly 40, the tip conductor protected by the protector assembly 40' or both conductors. Current entering through the ring conductor, bridges the associated gap 99 between the center electrode 101 and the base electrode 106 of the protector assembly 40 and is conducted to a source of ground potential through the cup 93 and the grounding subassembly 44 (see FIG. 14B).

Figure 14B:
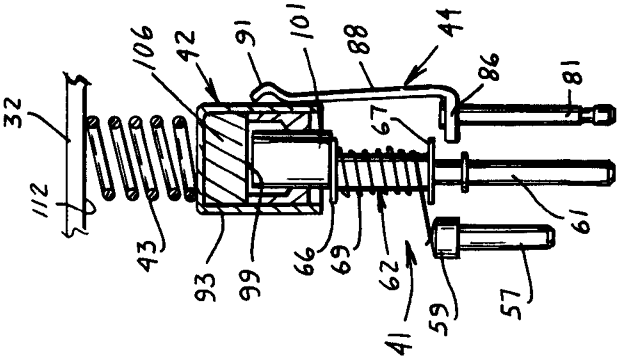
FIGS. 14A and 14B are schematic views of a prior art protector device and the protective device of this invention.
Figure 14A:
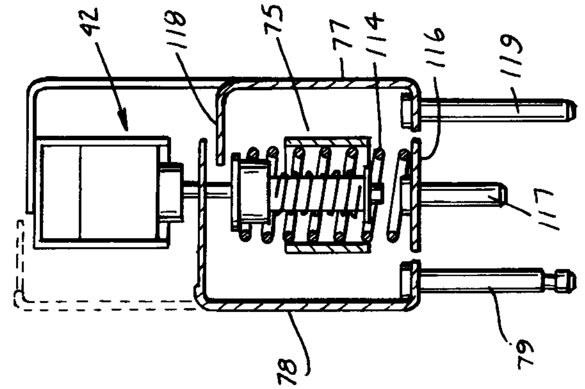
FIG. 14A PRIOR ART

As can be seen in FIGS. 3, 7 and 14B of the drawings, an upper portion of each of the voltage protection subassemblies 42—42 is engaged by a compression spring 43 which also engages an inner portion 112 of the housing 32 of the protector unit. The spring 43 maintains the center electrode 101 in engagement with the eyelet 62. Also, the spring is adapted to cause the eyelet 62 to be moved from an initial, first position on the line pin 61 where it is bonded to the line to a second position where a flange 67 of the eyelet engages the base plate 86 of the grounding subassembly 44.

It is significant that each line pin 61 comprises a portion of associated heat coil subassembly 50 (see FIGS. 9 and 14B) and is aligned vertically with the eyelet 62 thereof. The centerline of the line pin 61 and of the heat coil is offset 0.22 cm from the centerline of the voltage protection subassembly 42. This is unlike prior art protector assemblies in which the heat coil assembly is aligned with the centerline of the voltage protection subassembly 42 (see FIG. 14A). As a result, the use of a separate line terminal assembly is obviated. The line pin 61 and eyelet 62 with the winding of the resistance wire 69 are made in one assembly thereby reducing the number of component parts for the protector assembly 40.

Another advantage of the protector assembly 40 of this invention is that the spring 43 is removed from both the normal transmission and fault current paths. It provides a force for urging the eyelet 62 into engagement with the ground plate 86 but is not in the normal current path or the fault current circuit. The current flow path for the prior art protector module shown in FIG. 14A is up through the line pin 79 and terminal 78, through a pressure contact with a pin of the heat coil subassembly 75 and the heat coil winding, through a pressure contact with one end of a spring 114, such as in U.S. Pat. No. 4,215,381, through the spring to another pressure contact with a bottom plate 116 and out through a central office pin 117. For a voltage fault, the current flows through the voltage protector 42 and out through the ground terminal 77 and a ground pin 119. In the event of current overload, the fusible alloy which bonds the heat coil subassembly 75 to a pin is melted to allow the spring 114 to urge the heat coil flange into engagement with a tab 118 that is connected to the ground pin 119. Since the spring 114 moves, it is necessary to use an insulator to prevent a short circuit. Because the spring 43 in the protector assembly 40 of this invention is not in the normal circuit path, the insulating sleeves are not required.

In a method of assembly of the protector module 30 of this invention, the steps are simplified since the number of components have been substantially reduced. In one prior style protector, it is necessary to preassemble the ground plate, the base and the carbon blocks with the line terminal assembly. As will be recalled the line terminal assembly included the heat coil insulators and the spring which had to be fit into a priorly assembled portion. This is difficult to do and often necessitates auxiliary tools. The assembly of the protector of this invention is "self adjusting". The components are held together easily while an assembly person performs the assembly process.

In a first step, the housing 32 is inverted to orient the handle portion 38 downwardly. Two compression springs 43—43 are allowed to descend into the housing 32. After the springs 43—43 engage the inverted top portion of the housing 32, two preassembled voltage protection subassemblies 42—42 are dropped into the housing, one in alignment with each of the springs. Then the left-hand and right-hand base portions 51 and 52 of the heat coil assembly with the line pins 61—61 and the central office pins 57—57 and with the grounding subassembly 44 having the pin 81 in the passageway formed by the mating base halves are moved into the housing 32. The base tabs 36—36 are snap-locked into slots 37—37 extending from the housing to secure the assembly.

In the operation of the protector module 30 of this invention, the wire 69 which has convolutions wound on the eyelet 62 of the pin eyelet assembly 60, functions as a resistance element with the heat being concentrated therein. In a normal operating mode, current flows in through the line pin 61, through the convolutions of the wire 69 wound on the eyelet 62 and out through the central office pin 57. Advantageously all the connections between these parts which constitute the current path, are connected by welding or by soldering with no pressure contacts as in prior art protector assemblies.

In the event of excessive current, the current path is as before except that since the current exceeds that of the design load, the unit overheats from the energy generated by the excessive current. The wire 69 generates heat which is transferred to the eyelet 62 and which is sufficient to cause the fusible alloy which bonds the eyelet to the line pin to melt. At that time, the spring 43 becomes effective to move the eyelet 62 from its first position where it is bonded to the pin 61 toward the base to a second position where it engages the plate 86 of the grounding subassembly (see FIG. 14B). The lower flange 67 of the eyelet 62 functions as a shunting element. As a result the current flows through the line pin 61, the eyelet 62 and directly to the ground plate, substantially shortening the current path from that of prior art protector assemblies.

In the event of a voltage overload, the current moves as before through the line pin 61, through the pin eyelet assembly 60 through the center electrode 101 of the voltage protector bridging the gap 99 to the base electrode 106 into the cup 93. There is a spark-over between the center and the base electrodes 101 and 106, respectively, of the voltage protection subassembly. Current is conducted through the spring finger 91 to the ground plate 86 and out the ground pin 81 to the source of ground potential. In the event of a sustained voltage surge, sufficient heat is transferred from the center electrode 101 to the eyelet 62 to cause heat to be transferred through the eyelet 62 to melt the alloy which holds the eyelet and line pin 61 together. At that time, as before with the excess current occurrence, the eyelet 62 is caused to be moved along the pin 61 under the urging of the spring 43 to cause the flange 67 of the eyelet to engage the ground plate 86 and establish a shortened, fault current path.

Another embodiment 120 (see FIG. 18) of this invention includes provisions made for direct test access to the tip and ring line conductors of the protector assemblies. Referring now to FIGS. 18-21, it is seen that a housing 121 is provided with two access openings 122—122 adjacent to the handle portion 38. The protector module 120 includes two heat coil subassemblies 41—41', two voltage protection subassemblies 42—42', a grounding subassembly 44 and two springs 43—43.

Figure 22:
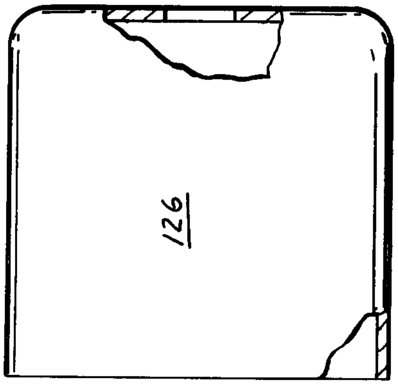
FIG. 22 is an elevational view of a portion of a spring retainer.
Figure 23:
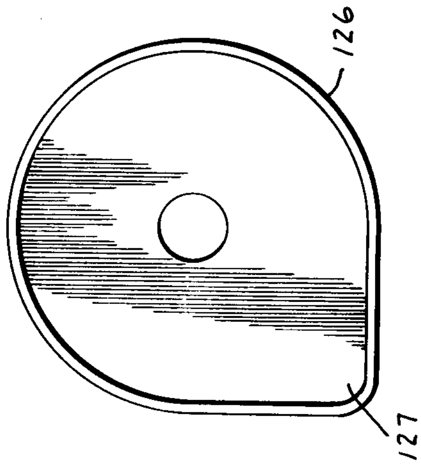
FIG. 23 is a plan view of the retainer shown in FIG. 22.

Additionally, the protector module 120 includes two spring retainers 126—126 (see FIGS. 22-23). The spring retainer 126 is cup-shaped and has an eccentrically disposed portion 127 and is made of a metallic material. In an inner end of each retainer is disposed a spring 43.

Figure 24:
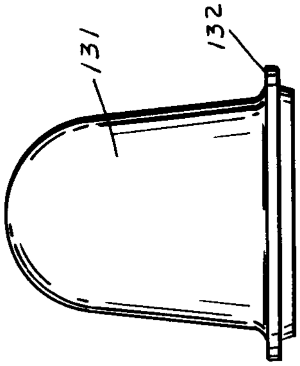
FIG. 24 is an elevational view of an insulator.

The embodiment also includes an insulator 131 (see FIG. 24) which is made of a plastic material and which includes a flange 132. Each insulator 131 extends into a spring 43 with the flange 132 preventing its spring from touching the cup 93.

Figure 25:
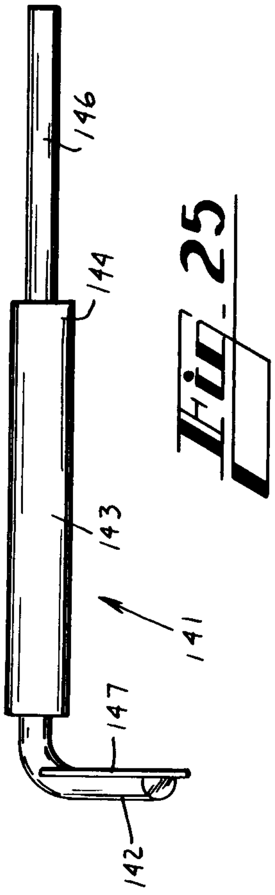
FIGS. 25–27 are views of a strap for use with the embodiment shown in FIG. 18.
Figure 26:
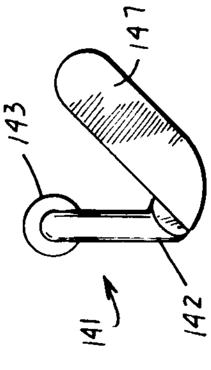
Figure 27:
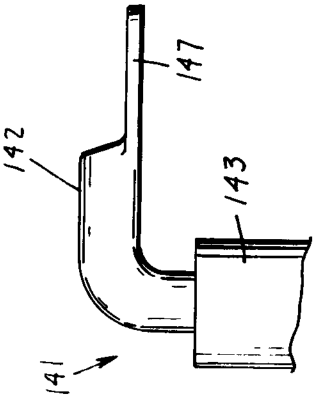

A wire strap 141 (see FIGS. 25-27) is provided to extend each circuit electrically to the vicinity of the access openings 122—122. The strap 141 includes a hooked end portion 142, a portion 143, which is covered with an insulative material 144 and an end portion 146. The strap 141 is adapted to be received in the eccentric portion 127 of the spring retainer 126 with the end portion 146 also engaging the outer diameter face of the compression spring 43. A flattened or swaged portion 147 of the hooked end of the strap 141 extends between the exposed face of the center electrode 101 and the flange 66 of the eyelet 62.

The wire strap 141 is assembled with the modified housing 121, the current protection subassembly 41, the voltage protection subassembly 42 and the grounding subassembly 44. Insulation is used to cover the portion 143 inasmuch as it extends adjacent to the cup 93. But for the insulation, inadvertent undesired electrical engagement between the cup 93 and the wire strap could occur.

Figure 20:
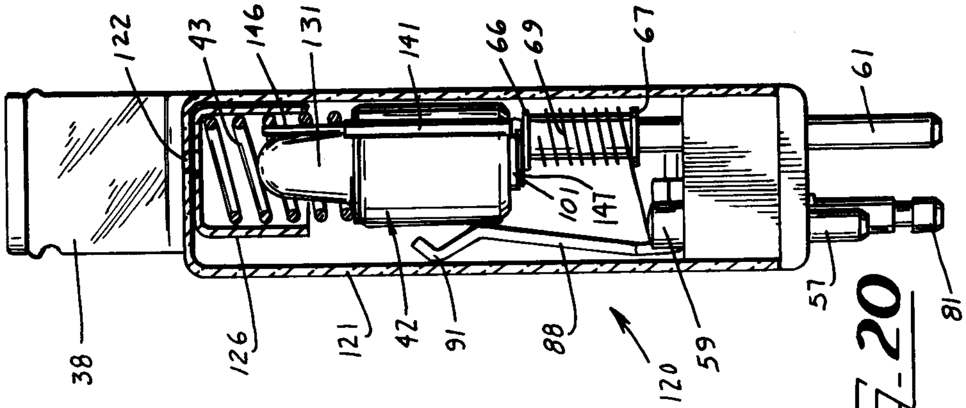
Figure 19:
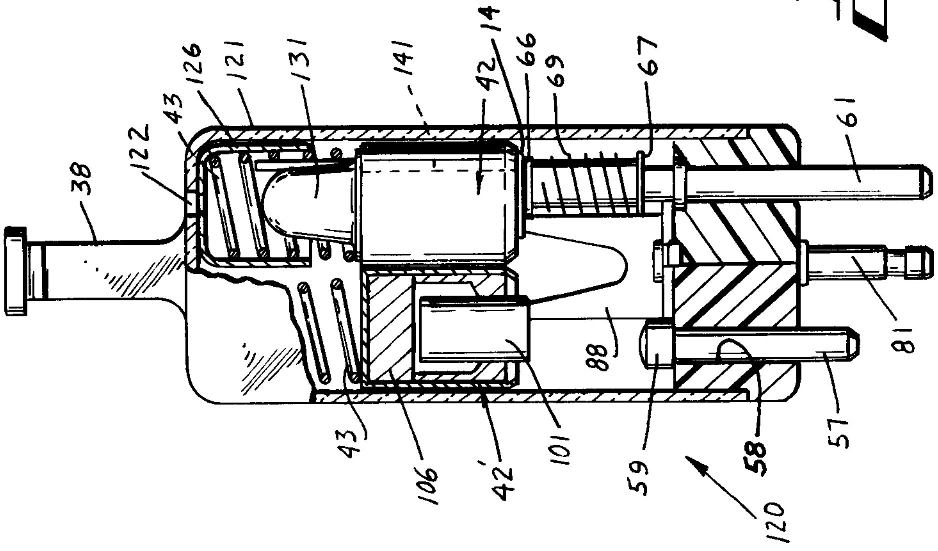

The need for the insulator 131 becomes apparent from a study of the detail assembly of the embodiment 120 which is shown in FIGS. 19-20. One end of the spring 43 is received in and engages the inner portion of the cup-shaped retainer 126. The end of the strap 141 is in electrical contact with the retainer 126 and the spring 43. In the embodiment 30 shown in FIG. 3, the spring 43 is electrically connected to the cup 93 and so is at ground potential; however, the cup and the spring are disposed within an insulated housing 32. On the other hand, in the embodiment 120, the strap 141 completes a circuit from the line pin 61 to the spring 43. If the spring 43 were not insulated from the cup 93 which is grounded, the normal current path would be shorted to ground. The insulator 131 removes the spring from its normally idle, ground circuit and accommodates it as an idle component in the normal current circuit.

It should be understood that while the preferred embodiment of this invention includes two identical protector assemblies disposed within a single housing, the invention is not so limited. For example, and depending on the use to which the assembly is put, it could include a grounding subassembly, a heat coil subassembly and a voltage surge limiter subassembly disposed on one side of the grounding subassembly. The other side of the housing may support a dummy heat coil subassembly.

Further, the heat coil and/or voltage protection characteristics on one side of the module 30 need not be identical to those on the other side. The voltage protection can be changed by changing the gap 99 and the current protection can be changed by providing more or less resistance in the wound wire 69.

It is to be understood that the above-described arrangements are simply illustrative of the invention. Other arrangements may be devised by those skilled in the art which will embody the principles of the invention and fall within the spirit and scope thereof.

What is claimed is:

1. An electrical protector assembly for protectng a circuit against excessive current increases and excessive voltage surges, said protector assembly comprising:
- a dielectric housing for supporting the assembly;
- a grounding subassembly for grounding said protector assembly when excessive voltage surges and excessive current increases occur in the circuit;
- a voltage protection subassembly connected electrically to said grounding subassembly;
- a current protection subassembly including a dielectric base for supporting first and second electrically conductive elements and a shunting element which are connected together to establish electrical contact between the circuit and said protector assembly, said shunting element being aligned axially with said first element which extends through said base and releasably secured thereto by a fusible bonding material; and
- means interposed between said voltage protection subassembly and said housing for maintaining said voltage protection subassembly in electrical engagement with said shunting element, and which is effective upon the melting of the fusible bonding material caused by the flow of current above a predetermined level for causing said shunting element to be moved along said first element to engage said grounding subassembly and provide a current path from said first element to said grounding subassembly.

2. The protector assembly of claim 1, wherein said means is removed from a circuit between said first and second electrically conductive elements and from the current path from said first element to said grounding subassembly.

3. The protector assembly of claim 1, wherein an axis through said shunting element and said first conductive element is offset from an axis of said voltage protection subassembly.

4. An electrical protector assembly for protecting a circuit from excessive current increases and excessive voltage surges, said protector assembly comprising:
- a dielectric housing for supporting said assembly;
- a current protection subassembly which comprises a dielectric base adapted to be secured to said housing, first and second electrically conductive pins supported in said base and extending therethrough, a sleeve which is disposed concentrically about one end of said first pin and held releasably in an initial position thereon by a fusible bonding material and which has electrically conductive end portions, and a wire having predetermined resistance characteristics which is wound about an outer surface of said sleeve with one end being connected electrically to one of said ends of said sleeve and with its other end being secured to said second pin to establish a current path from said first pin through said sleeve and said wire to said second pin;

a voltage protection subassembly which includes first and second electrodes with said first electrode engaging one end of said sleeve and with said electrodes supported within said housing in a manner to provide a predetermined gap therebetween;

a grounding subassembly which is connected electrically to said second electrode to provide a current path from said first pin through said first electrode across said gap to said second electrode and to ground during a voltage surge which is sufficient to cause the current to bridge said gap; and resilient means which is disposed between said voltage protection subassembly and said housing for maintaining said first electrode in engagement with said one end of said sleeve and which is rendered effective upon the melting of the fusible bonding material caused by the flow of excessive current for causing said sleeve to be moved along said first pin to a second position where one end of said sleeve engages said grounding subassembly to provide a fault current path from said first pin to said grounding subassembly.

5. The protector assembly of claim 4, wherein said resilient means is removed from the current path from said first pin to said second pin and from said fault current path.

6. The protector assembly of claim 4, wherein the fusible bonding material is melted by heat transfer from said voltage protection subassembly into said sleeve as a result of a sustained voltage surge.

7. The protector assembly of claim 4, wherein said current protection subassembly includes current responsive, heat sensitive means which includes said sleeve and said wire and which is offset from an axis which extends through said electrodes of said voltage protection subassembly.

8. The protector assembly of claim 4, wherein said housing includes test access openings at one end thereof and said assembly further includes a strap which extends from and which is connected electrically to said current protection subassembly in the vicinity of said sleeve.

9. The protector assembly of claim 8, wherein said voltage protection subassembly is supported in a metallic cup with said second electrode being in electrical contact with said cup and said first electrode being insulated from said cup, and wherein said strap includes a portion which is disposed adjacent to said cup of said voltage protector subassembly and which is insulated to prevent electrical engagement of said portion of said strap with said cup.

10. The protector assembly of claim 8, wherein said strap includes a portion which is disposed between said first electrode of said voltage protection means and said sleeve of said current protection means.

11. The assembly of claim 4, wherein said first pin of said current protection subassembly includes:

a contact pin for establishing direct engagement with the circuit to be protected, said pin extending through said base; and a shoulder formed on said pin and encapsulated by said base for resisting forces applied to said pin when said assembly is connected to said circuit.

12. The electrical protector assembly of claim 4, wherein said voltage protection subassembly includes center and base carbon electrodes, insulative means for holding said center electrode such that it is axially aligned with said base electrode and spaced therefrom with said electrodes being spaced apart axially a predetermined distance to form a spark-gap, said center electrode engaging a conductive end portion of said sleeve to which said end portion of said wire is electrically connected and conductive means for supporting said carbon electrodes within said housing, said conductive means being in electrical engagement with said base electrode and with said grounding subassembly.

13. The protector assembly of claim 12, wherein said first pin comprises a pin-eyelet assembly in which said sleeve is an eyelet that is positioned over one end of said first pin and releasably secured thereto by the fusible bonding material, said pin-eyelet assembly having an axis which is offset from an axis that extends through said center and base electrodes.

14. The electrical protector assembly of claim 4, wherein said sleeve is an eyelet comprising a hub portion about which said convolutions of said wire can be wound and a conductive flange at each end thereof.

15. The electrical protector assembly of claim 14, wherein said wire is insulated and said sleeve is made of a metallic material.

16. The electrical protector assembly of claim 4, wherein the circuit to be protected includes a tip conductor and a ring conductor with one said current protection subassembly, one said voltage protection subassembly, one said compression spring and a portion of said grounding subassembly being associated with each of the tip and the ring conductors, said first pin of each said current protection subassembly being a line pin and said second pin being a central office pin.

17. The protector assembly of claim 16, wherein said current protection subassembly, said voltage protection subassembly, and said compression spring associated with each of the tip and ring conductors of the circuit and said grounding subassembly are mounted in said housing, said electrodes of each said voltage protection subassembly being spaced apart and positioned along a common axis, each said common axis being spaced from a centerline axis of said protector assembly, and each said common axis being offset from an axis which extends through said first pin and said sleeve.

18. The electrical protector assembly of claim 17, wherein said voltage protection means includes a gaseous discharge device which is associated with each of the tip and ring conductors.

19. An electrical protector assembly for protecting a circuit against excessive voltages and excessive currents, said assembly including:

a dielectric housing;

grounding means disposed within said housing for providing a current path to ground when excessive voltage surges and excessive currents appear in the circuit;

a current protection subassembly which includes:

a dielectric base; and current responsive means for sensing excessive currents, said current responsive means including a first metallic contact element for establishing electrical contact between the circuit and said protector assembly and a metallic sleeve which is disposed concentrically about and secured to one end of said first contact element by a fusible bonding material, said sleeve having a conductive flange at each end thereof, and windings of an insulated wire having a predetermined resistance wound about an outer surface thereof, said first contact element extending through said base and said wire having an end portion which extends to and is bonded to said sleeve adjacent to one end of said first contact element, said sleeve being adapted to establish a fault current path with said grounding means when the current increases beyond a predetermined level;

a surge voltage protection subassembly engaging said grounding means and including means being in engagement with one of said flanges of said sleeve of said current responsive means;

a second metallic contact element which extends through said base, and which is connected electrically to said current responsive means through said wire which has its other end bonded to said contact element, said second contact element and said first contact element adapted to conduct normal circuit current with the application of normal circuit voltage; and spring means disposed between said voltage protection subassembly and said housing and removed from the normal current and the fault current paths for biasing said surge voltage protection subassembly into engagement with said one of said conductive flanges of said sleeve of said current responsive means and being effective upon the occurence of excess heat, which is generated by current above the predetermined level and which is sufficient to melt the fusible bonding material, to move said sleeve to cause the other flange to engage said grounding means and establish the fault current path.

20. The protector assembly of claim 19, wherein an axis through said first metallic contact element of said current responsive means is offset from an axis of said surge voltage protection subassembly.

21. An electrical protector assembly for protecting a tip conductor and a ring conductor of a circuit against excessive voltage surges and excessive current increases, said assembly comprising:

a dielectric housing;

a dielectric base which is snap-locked to said housing;

grounding means secured to said base for grounding said protector assembly when excessive voltage surges and excessive currents appear in the circuit to be protected;

a voltage protection subassembly which is associated with each conductor and which is mounted in said housing, said voltage protection subassembly including:

a first carbon electrode;

a second carbon electrode adapted to be connected electrically to the conductor to be protected, aligned with said first electrode, spaced a predetermined distance therefrom and cooperating with one end thereof to form a gap across which excess voltage surges may be dissipated to said grounding means; and electrically conductive supporting means for holding said first and second carbon electrodes in aligned, spaced relationship within said housing, said supporting means being connected electrically to said first carbon electrode and to said grounding means;

a current protection subassembly which is associated with each conductor and which is mounted in said housing, said current protection subassembly comprising:

a first conductive member which extends through said base and which is adapted to connect the conductor to be protected to said current protection subassembly;

a second conductive member which extends through said base and which is adapted to cooperate with said first conductive member to conduct normal circuit current;

a movable conductive element which is secured releasably to said first conductive member in a first position and being connected electrically thereto, said movable conductive element being in electrical engagement with said second carbon electrode;

heat generating means having one end thereof connected electrically through said movable conductive element to said first conductive member and the other end thereof connected to said second conductive member; and heat responsive, releasable means for securing said movable conductive element to said first conductive member in a first position and rendered effective by the occurence of excessive current above a predetermined level for permitting said movable element to establish an electrical connection with said grounding means; and resilient means interposed between each of said voltage protection assemblies and said housing for maintaining said second electrode in electrical engagement with said movable conductive element and for moving said movable conductive element to a second position along said first conductive member into engagement with said grounding means when the heat responsive releasable means is rendered effective by an excessive amount of heat produced by said heat generating means in the presence of current flow above the predetermined level.

22. The assembly of claim 21, wherein said grounding means includes a ground plate which is disposed between inner ends of said first and second conductive members, which is disposed adjacent to said base, and which is adapted to be engaged by one end of said moveable conductive element when said conductive element is moved to its second position;

a pin having an end secured to said ground plate and extending through said base; and a bifurcated portion connected to said ground plate and extending laterally thereof, said portion having furcations each of which includes a free end that engages one of said conductive means which supports the electrodes of one of said voltage protection subassemblies.

23. The assembly of claim 21, wherein said heat generating means is a coil of wire having predetermined electrical characteristics, said heat responsive releasable means is a fusible bonding material, said first conductive member is a line pin and said movable conductive member is a sleeve coaxially secured to said pin by said bonding material.

24. The assembly of claim 21, wherein said housing includes two test access openings at one end thereof, a retainer for said resilient means disposed between said resilient means and said housing and a metallic strap which extends from and which is connected electrically to each said current responsive subassembly and to said retainer.

25. The assembly of claim 24, which also includes means for insulating said resilient means from said supporting means and said strap includes an insulated portion and a portion which extends laterally thereof and which is disposed between and in engagement with said current protection subassembly and said second electrode of said voltage protection subassembly.

* * * * *